(12) United States Patent
Pfeiffer

(10) Patent No.: US 6,959,487 B2
(45) Date of Patent: Nov. 1, 2005

(54) HEAD DISC MERGE ASSEMBLY FOR USE AT A MERGING STATION

(75) Inventor: Michael W. Pfeiffer, Savage, MN (US)

(73) Assignee: Seagate Technology LLC, Scotts Valley, CA (US)

(*) Notice: Subject to any disclaimer, the term of this patent is extended or adjusted under 35 U.S.C. 154(b) by 0 days.

(21) Appl. No.: 10/458,634

(22) Filed: Jun. 10, 2003

(65) Prior Publication Data

US 2004/0250416 A1 Dec. 16, 2004

Related U.S. Application Data

(63) Continuation of application No. 10/454,904, filed on Jun. 4, 2003.

(51) Int. Cl.[7] .............................. G11B 21/08; G11B 5/55
(52) U.S. Cl. .................. 29/737; 29/603.01; 29/603.03; 29/729; 360/265.9
(58) Field of Search ...................... 29/737, 729, 603.03, 29/603.01; 360/265.7, 265.9, 266, 266.1

(56) References Cited

U.S. PATENT DOCUMENTS

| | | | |
|---|---|---|---|
| 3,582,214 A | | 6/1971 | Loomis |
| 4,576,482 A | | 3/1986 | Pryor |
| 4,647,997 A | * | 3/1987 | Westwood ............... 360/256.1 |
| 4,833,559 A | | 5/1989 | Belk |
| 4,939,611 A | * | 7/1990 | Connolly ................ 360/265.1 |
| 5,027,241 A | * | 6/1991 | Hatch et al. ............... 360/255 |
| 5,069,042 A | | 12/1991 | Stuchlik, III |
| 5,309,223 A | | 5/1994 | Konicek et al. |
| 5,309,295 A | | 5/1994 | Bailey et al. |
| 5,333,208 A | | 7/1994 | Massen |
| 5,438,209 A | | 8/1995 | Yamamoto et al. |
| 5,613,293 A | | 3/1997 | Slade et al. |
| 5,790,331 A | | 8/1998 | Aranovsky |
| 5,801,899 A | * | 9/1998 | Genheimer ............. 360/97.01 |
| 5,811,825 A | | 9/1998 | Pryor et al. |
| 5,826,325 A | * | 10/1998 | Price et al. ............. 29/603.03 |
| 5,926,558 A | | 7/1999 | Zelt, III et al. |
| 6,226,395 B1 | | 5/2001 | Gilliland |
| 6,404,912 B1 | | 6/2002 | Lehnen et al. |

* cited by examiner

Primary Examiner—A. Dexter Tugbang
Assistant Examiner—Tai Nguyen
(74) Attorney, Agent, or Firm—Jennifer M. Buenzow

(57) ABSTRACT

A head disc merge assembly for merging an actuator with a disc stack having a disc, the actuator assembly having a flexure supporting a data transducer head, the head disc merge assembly including a merge comb having a flexure support member to support the flexure away from the disc while positioning the data transducer bead on the disc. A merge comb inspection station is provided having a body with a certification slot. The merge comb is moved into engagement with the certification slot, and successful passage there through indicates that the merge comb has an acceptable clearance condition for continued use at the merge station, while an unsuccessful passage through the certification slot indicates that the merge comb has an unacceptable non-clearance condition, and the electrical continuity check circuit is activated to stop the merge station for replacement of the merge comb.

10 Claims, 10 Drawing Sheets

HEAD DISC MERGE ASSEMBLY FOR USE AT A MERGING STATION

RELATED APPLICATIONS

This application is a continuation of a U.S. patent application Ser. No. 10/454,904 entitled MERGE COMB INSPECTION APPARATUS AND METHOD filed Jun. 4, 2003.

FIELD OF THE INVENTION

The claimed invention relates generally to disc drive data storage devices and more particularly a merge comb inspection apparatus.

BACKGROUND

Disc drives are digital data storage devices that store and retrieve large amounts of user data in a fast and efficient manner. The data are magnetically recorded on the surfaces of one or more rigid data storage discs affixed to a spindle motor for rotation at a constant high speed. The discs and spindle motor are commonly referred to as a disc stack.

The disc stack is accessed by an array of vertically aligned data transducer heads that are controllably positioned by an actuator assembly. Each head typically includes electromagnetic transducer read and write elements that are carried on a fluid bearing slider. The fluid can be air or alternatively a fluid such as helium. The slider acts in a cooperative hydrodynamic relationship with a thin layer of fluid dragged along by the spinning discs to fly each head in a closely spaced relationship to the disc surface.

In order to maintain the proper flying relationship between the heads and the discs, the heads are attached to and supported by flexible suspension assemblies, also called flexures. An actuator motor, typically a voice coil motor (VCM), rotates the actuator assembly to cause the heads to move across the disc recording surfaces. The actuator assembly is also referred to as a head stack assembly (HSA). Both the disc stack and the head stack assembly are mounted to and supported by a rigid base deck of the drive.

Disc drives are typically manufactured using high volume automated assembly lines. In a typical automated line, the drives are assembled on pallets conveyed to various assembly stations, each station adding a different set of components to, or performing a different operation on, the drives.

One such station commonly found in a typical automated assembly line is a head disc merge station in which a head stack assembly is merged with a disc stack. The term "merge" in this context refers to the insertion and positioning of the heads into the disc stack, that is, positioning the heads between and adjacent to the discs in their final assembled relationship.

In some merge stations, following the merging of the head stack assembly and the disc stack, the merged head stack assembly and disc stack are together mounted to the base deck. In other merge stations, the sequence of assembly is to mount the disc stack to the base deck; mount the head stack assembly to the base deck with the heads at a position outside the outermost diameter of the disc stack; and rotate the head stack assembly to merge the heads into the disc stack.

Typically, at the conclusion of a merge operation, the heads are positioned near an innermost diameter of the disc stack, resting against textured landing zones on the disc surfaces. The landing zones provide reduced stiction between the heads and discs to allow the heads to safely park during non-operation of the drive.

A latching arrangement secures the head stack assembly when the heads are parked to prevent the heads from inadvertently contacting the data recording surfaces in response to the application of a mechanical shock to the drive, as allowing the heads to contact the data recording surfaces when the discs are not rotating can damage the drive.

It is thus necessary to support the heads above the respective disc surfaces during the merge operation as the heads are positioned in the final park position. Some have proposed applying power to the spindle motor to rotate the discs and powering the actuator motor so that the heads are supported by disc rotation fluid bearings during the merge operation. Usually, however, the merge operation is performed with stationary discs and while the heads are supported as the heads are advanced to the park position.

Head stack assemblies are typically purchased from a head stack assembly manufacturer and are provided with removable shipping spacers. The shipping spacers are comb-like structures that support the flexures to protect the heads from inadvertent contact with each other and prevent deformation of the flexures during shipping and handling.

During a typical merge operation, a merge comb, or merge spreader, is inserted into the head stack assembly at the merge station to provide appropriate spacing between the heads. The spacer comb is removed once the merge comb engages the flexures, and the heads are advanced to the final park position.

Usually, the merge comb supports the flexures and the heads as the heads are moved from the outermost diameter of the discs to the innermost diameter of the discs in such a manner that contact is prevented between the disc stack and either the merge comb or head stack assembly until the merge comb releases the heads in the final park position. Once the heads are parked, the merge comb is retracted and the merge operation cycle is completed.

The merge combs can become bent or otherwise damaged. Thus, it has been necessary to implement an inspection routine to minimize or avoid the damage that occurs with unwanted contact between the merge comb and the disc stack. Otherwise, expensive rework or component replacement is risked.

Some merge comb inspection methods include go/no go gages applied by an assembly operator prior to the merge operation cycle. This is time consuming, as well as being subjective to operator judgment. Another merge comb inspection method is that of removing the merge comb from the merge station and subjecting the merge comb to traditional inspection routines. Again, however, this latter mentioned merge inspection method is time consuming. Any improved quality from the methods comes at the cost of reduced production rates.

There is therefore a continuing need for an accurate and fast method and apparatus to inspect a head disc merge comb to avoid damage to disc stacks, and to address other limitations associated with the current state of the art.

SUMMARY OF THE INVENTION

In accordance with preferred embodiments, a head disc merge assembly is provided for merging a disc stack assembly with a disc stack, the head stack assembly having at least one flexure supporting a data transducer head and the disc stack having at least one disc with a data storage surface.

The head disc merge assembly has a merge comb with a merge arm which engages and supports the flexure at an elevation determined to establish a clearing relationship between the head and the disc as the flexure arm and heads are moved adjacent the disc storage surface. The merge comb has either an acceptable clearance condition or an unacceptable non-clearance condition, the acceptable clearance condition being where the merge arm will successfully support the flexure arm at an elevation sufficient to establish a clearing relationship between the data transducer head and the disc as the data transducer head is positioned adjacent the data storage surface. If the merge comb is found to have a non-acceptable clearance condition, the merge comb will have an interference relationship with the disc stack.

A gage comb assembly is supported at the head disc merge assembly station, and the merge comb is moved into engagement with the gage comb. The gage comb assembly has a body portion having certification slots equal in number to the merge arms, and the dimensions of the certification slots are determined such that, if the merge arms of the merge comb are inserted without contact with the gage comb, the merge comb is determined to have an acceptable clearance condition, but contact of any merge arm with the gage comb will cause an electrical continuity check circuit to shut down the merge station for replacement of the merge comb.

Following merge comb replacement, the replacement merge comb is moved into engagement with the gage comb assembly, and if an acceptable clearance condition is indicated thereby, the operation of the merge station continues.

These and various other features and advantages which characterize the claimed invention will become apparent upon reading the following detailed description and upon reviewing the associated drawings.

DETAILED DESCRIPTION

Figure 1:
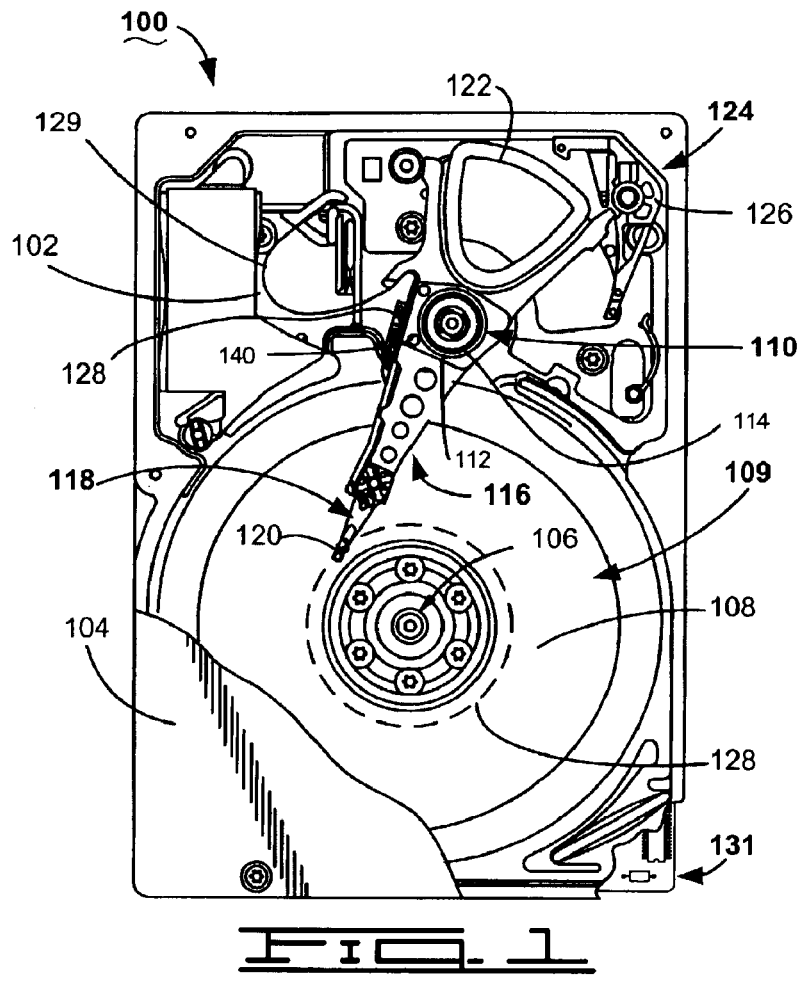
FIG. 1 is a top plan view of a disc drive constructed in accordance with preferred embodiments of the present invention.

FIG. 1 is a top plan view of a disc drive 100 constructed in accordance with preferred embodiments of the present invention. A base deck 102 and a top cover 104 (partially cutaway in this view) cooperate to form a sealed housing for the disc drive 100. A spindle motor 106 is supported by the base deck 102 and serves to support and rotate a number of magnetic recording discs 108 at a constant, high speed.

The discs 108 are stacked on a rotatable hub of the spindle motor 106 in a conventional fashion using suitable spacers and clamping elements (not separately designated). The spindle motor 106, discs 108, spacers and clamping elements collectively form a disc stack 109.

An actuator assembly 110, also called a head stack assembly or an HSA, includes a central body 112 configured to rotate about a cartridge bearing assembly 114 affixed to the base deck 102. A number of rigid actuator arms 116 extend from the central body 112 into the disc stack 109. Flexible suspension assemblies 118, also called flexures, extend from the arms 112 to support an array of data transducer heads 120.

While a single disc 108 and attendant data transducer heads 120 can be used, it is contemplated for purposes of the present discussion that the disc drive 100 includes a plurality of discs 108 and data transducer heads 120. Actuator arms 116 support the data transducer heads 120, with the top actuator arm 116 extending above the disc stack 109, as shown in FIG. 1, and the bottom actuator arm 116 extending below the disc stack 109. Each of the intermediary actuator arms 116, which extend between the discs 108, supports two flexures 118 and two data transducer heads 120.

The actuator assembly 110 is pivotally moved through the application of electrical current to a coil 122 of a voice coil motor (VCM) 124. When in a non-operational state, as shown in FIG. 1, the actuator assembly 110 is latched in a parked position by a toggle latch 126 and the data transducer heads 120 contact textured landing zones 128 (denoted by broken line) defined on the disc surfaces near the innermost diameters of the discs 108.

A flex circuit assembly 129 passes electrical signals between the head stack assembly 110 and a disc drive printed circuit board 131, also referred to as a PCB, and which supports communication and control electronics for the disc drive 100. The PCB 131 in FIG. 1 is mounted to the underside of the base deck 102.

Figure 2:
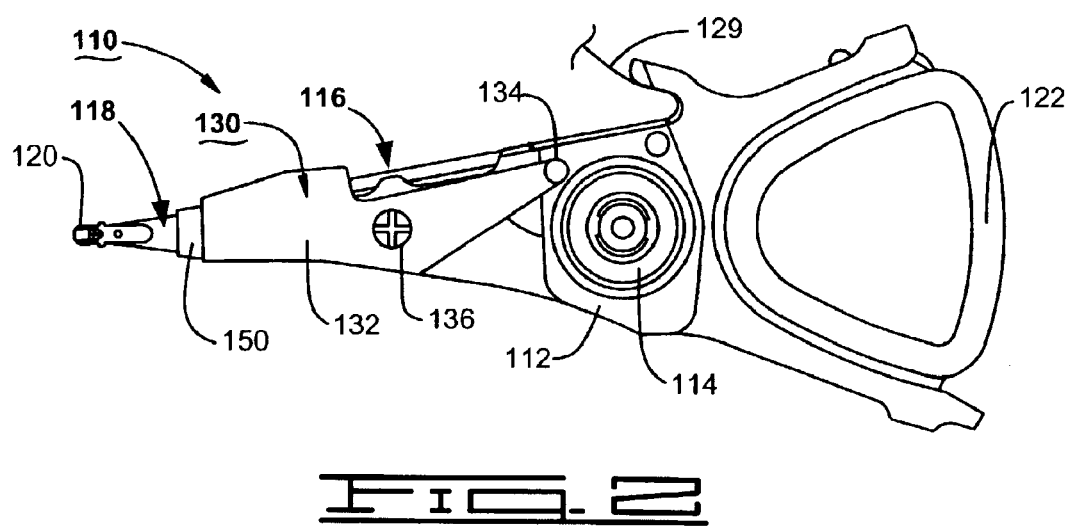
FIG. 2 is a top plan view of the actuator assembly of the disc drive of FIG. 1 having a shipping spacer thereon, the shipping spacer protecting the actuator assembly during shipping and handling prior to installation into the disc drive.
Figure 3:
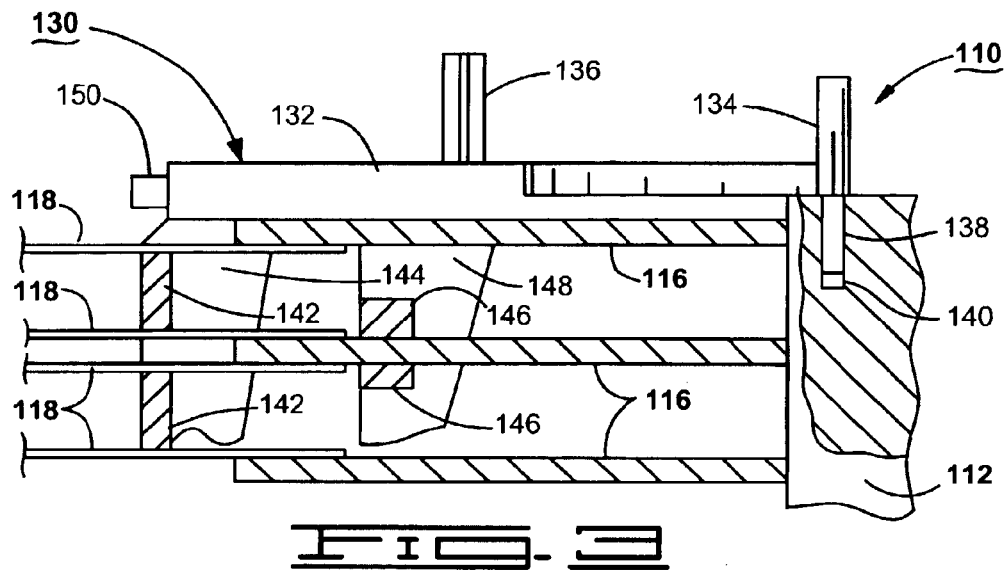
FIG. 3 is an elevational, partial cross-sectional view of the actuator assembly and the shipping spacer of FIG. 2.

FIG. 2 shows the actuator assembly 110 of FIG. 1 prior to installation onto the base deck 102. A vendor usually provides the actuator assembly 110 with a shipping spacer 130 to protect the components of the actuator assembly from damage during shipping and handling. As shown in FIG. 3, the shipping spacer 130 includes a main body portion 132 that extends along and is supported by the top surface of the top actuator arm 116. First and second alignment posts 134, 136 extend upwardly from the main body portion 132 as shown for manipulation of the shipping spacer 130. An alignment peg 138 extends downwardly from the first alignment post 134 and is inserted into a tooling bore 140 in the central body 112 of the actuator assembly 110.

The shipping spacer 130 further includes spacer members 142 (shown partially cut-away in FIG. 3) that extend between adjacent pairs of the flexures 118 to support the flexures in a desired spaced relationship. A spacer support arm 144 that extends downwardly from the main body portion 132 supports the spacer members 142. Actuator arm clip members 146 (also shown partially cut-away) are supported by a clip support arm 148 and are positioned to pressingly engage the intermediary actuator arm 116 as shown. A shipping spacer alignment tab 150 optionally projects from a distal end of the main body portion 132 and is engaged during the merging of the actuator assembly 110 with the disc stack 109.

Figure 4:
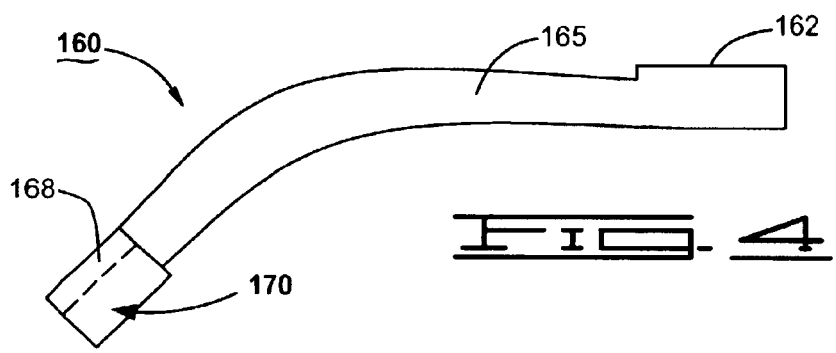
FIG. 4 is a top plan view of a merge comb that is used to merge the actuator assembly with the disc stack of the disc drive of FIG. 1 in accordance with preferred embodiments.
Figure 5:
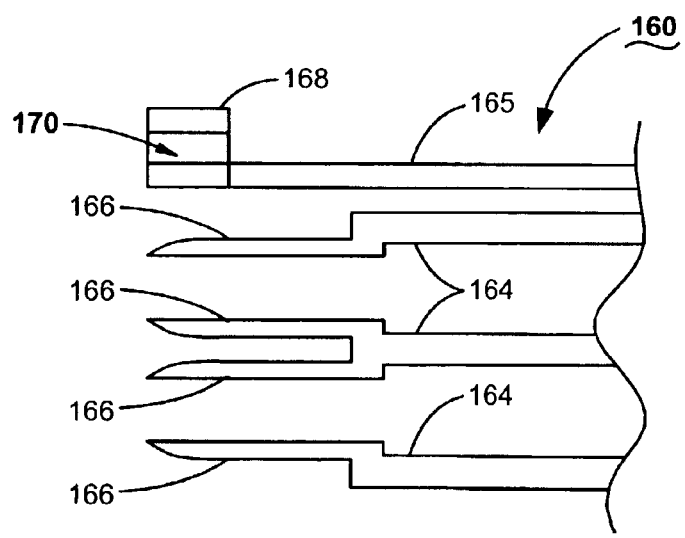
FIG. 5 is a partial elevational view of the merge comb of FIG. 4.

A merge comb 160, also referred to as a merge tool or a merge spreader, is shown in FIGS. 4 and 5. Preferably, a robotic arm, not shown in these figures, is connected to the merge comb 160 to merge the actuator assembly 110 with the disc stack 109. The merge comb 160 includes a main body portion 162 and a number of rigid merge arms 164 that extend from the main body portion 162. The shipping spacer 130 and the merge comb 160 are sometimes collectively referred to as a merge assembly.

The merge comb 160 can be provided with an upper merge arm 165 extending from the main body portion 162 substantially parallel to the top merge arm 164, although in most instances such upper merge arm 165 is not necessary. Each intermediate merge arm 164 supports a pair of flexure support finger members 166, as shown, while each of the upper and lower merge arms 164 supports a single flexure support finger member 166. When provided, the top merge arm 165 can be provided with an alignment body portion 168 that defines a channel 170 that receives an alignment portion of the shipping spacer, such as the shipping spacer alignment tab 150 (FIG. 3). The alignment tab 150 and the channel 170 should be configured for alignment and passage of the alignment tab 150 into and through the channel 170 during the merge operation. Again, this describes an optional structure, depending on the configuration and requirements of the shipping spacer provided with the actuator assembly.

Figure 6:
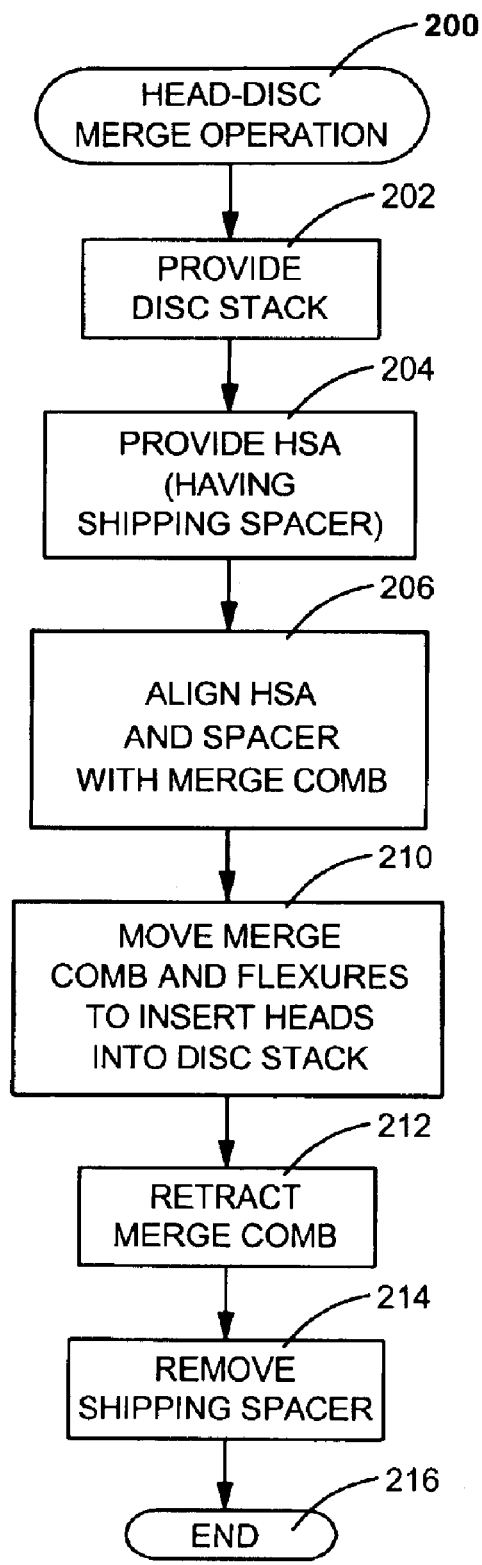
FIG. 6 is a flow chart that is generally illustrative of the steps of a head disc and disc stack merge operation.

FIG. 6 is a flow chart for a head disc merge operation 200 carried out as will now be described. Initially, a disc stack (such as the disc stack 109) is provided at step 202 and an actuator assembly (such as the actuator assembly 110) with a shipping spacer (such as the shipping spacer 130) is provided at step 204.

Figure 7:
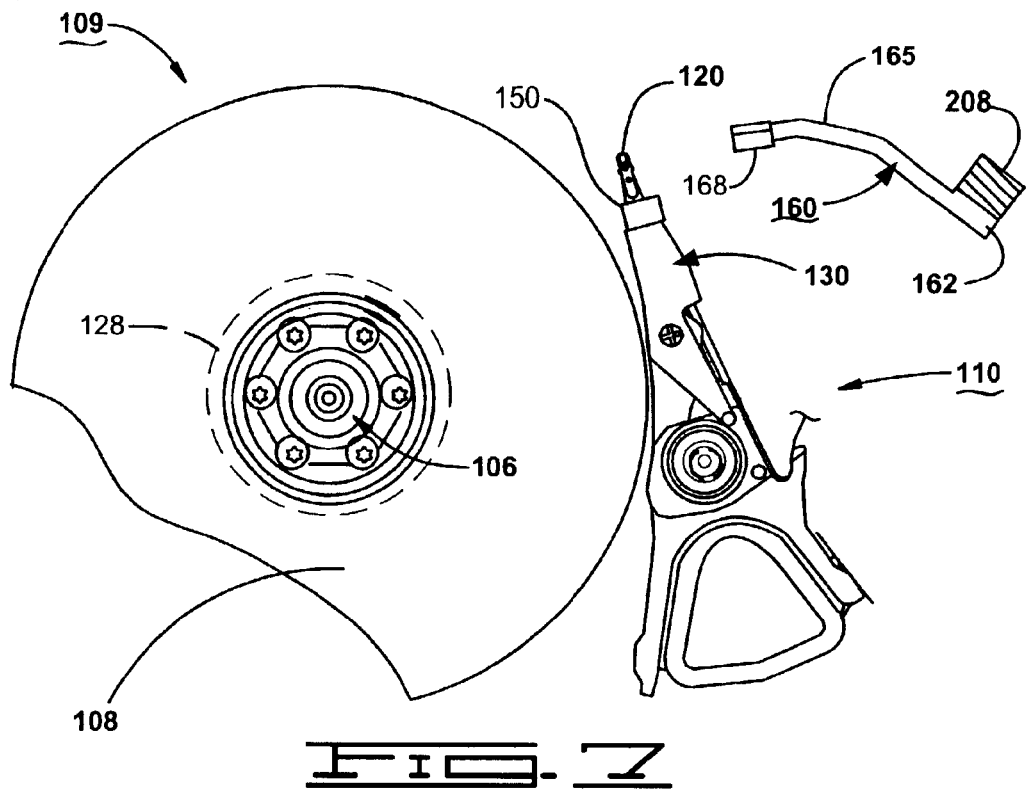
FIGS. 7 through 10 show the disc stack and actuator assembly at various stages of a head disc merge operation.

The disc stack 109 and the actuator assembly 110 will generally have a respective orientation at this point as shown in FIG. 7, with the data transducer heads 120 at a position beyond the outermost diameter of the disc stack 109. The disc stack 109 and the actuator assembly 110 are preferably mounted to the base deck 102 at this time. However, this is not limiting since the merge operation can alternatively be carried out prior to attachment of the actuator assembly 110 and the disc stack 109 to the base deck 102.

Figure 8:
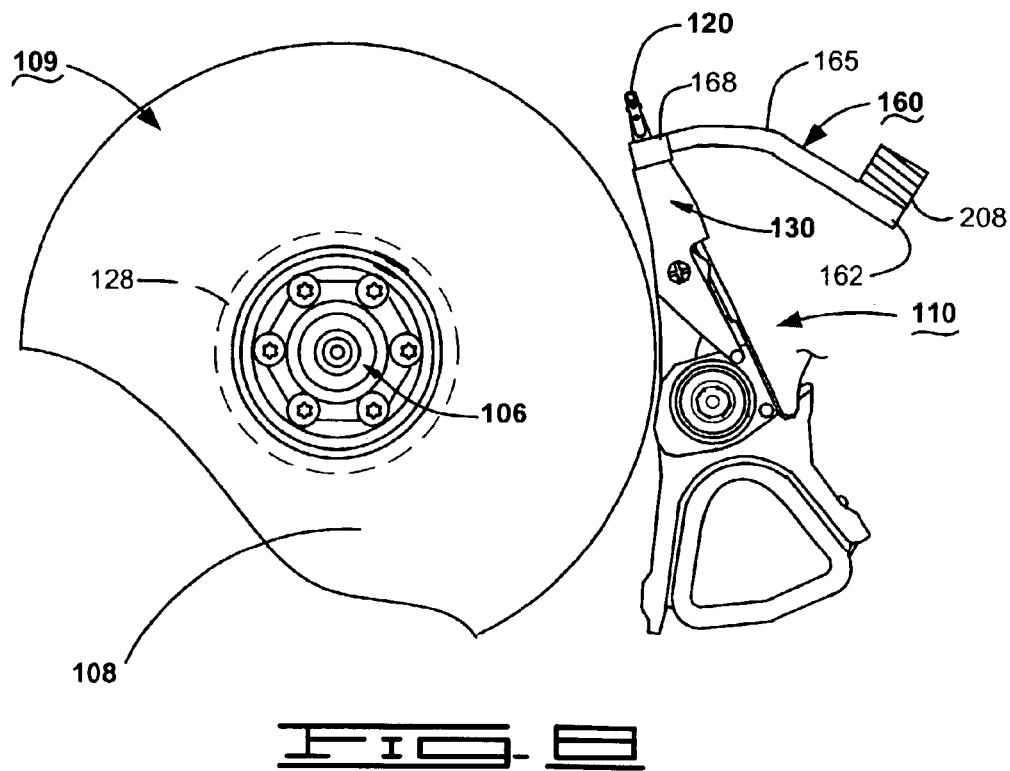

Continuing with the flow chart of FIG. 6, at step 206, a merge comb (such as the merge comb 160) is advanced to align with the actuator assembly 110 and the shipping spacer 130, as shown in FIG. 8. Preferably, a robotic arm 208 (depicted in partial cross-section) is affixed to the main body 162 of the merge comb 160, and the robotic arm 208 serves to advance the merge comb 160.

Figure 9:
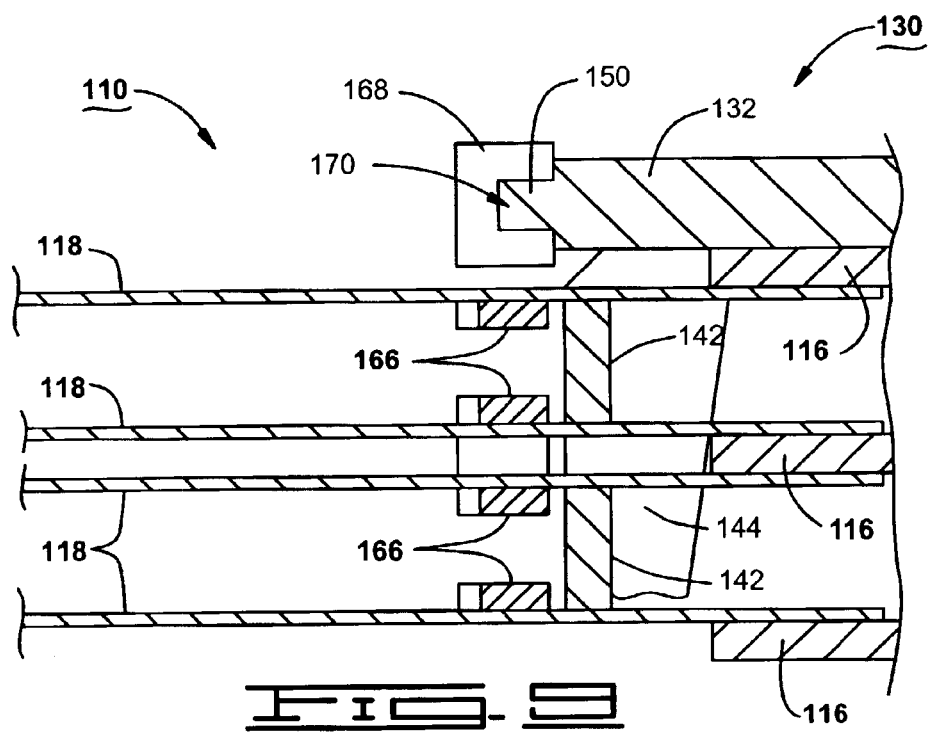

The alignment of the actuator assembly 110 and its shipping spacer 130 with the merge comb 160 during step 206 results in the placement of the flexure support members 142 into respective positions to support the flexures 118 as illustrated by FIG. 9. The elevation of the merge comb 160 is controlled with respect to the measured elevation of the disc stack 109 so that the elevational orientation of the shipping spacer 130 places the flexures 118 in alignment with the flex support finger members 166 and with the discs 108. When present, this will follow the shipping spacer alignment tab 150 being engaged by the merge comb alignment channel 170.

In this way, damage is averted as flex support finger members 166 of the merge comb 160 are brought into appropriate alignment with the discs 108. The flexures 118, typically made of spring steel, can be deformed beyond their elastic limit should the distal ends of the flex support finger members 166 mechanically interfere with the edges of the flexures 118. Severe damage can occur if the flex support finger members 166 fail to pass as intended along the sides of the respective flexures 118. Also, once the flex support finger members 166 correctly align and support the flexures 118, it is important that subsequent advancement of the merge comb 160 into the disc stack 109 occur without contact between the data transducer heads 120 and the discs 108. The material and dimensions of the merge comb 160 is preferably selected to ensure proper alignment to maintain the desired relative positioning of the flex support finger members 166.

Figure 10:
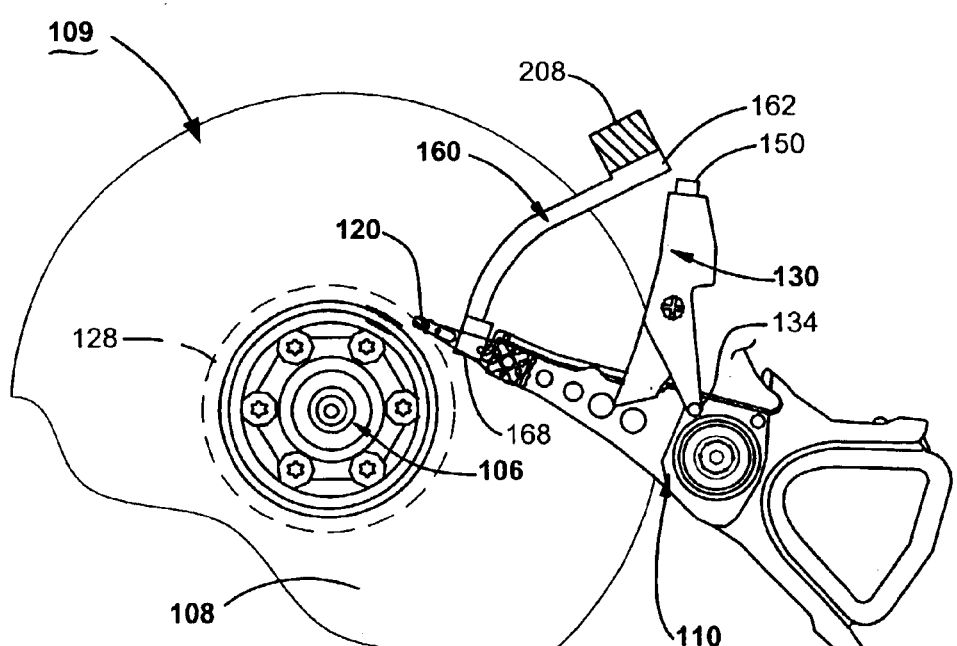

Continuing with the flow chart of FIG. 6 at step 210, the merge comb 160 is next used to advance the data transducer heads 120 to the desired final park position, as shown in FIG. 10. As the merge comb 160 is advanced beyond the orientation shown in FIGS. 8 and 9, the shipping spacer 130 will come into contact with the outer edges of the discs 108, and the shipping spacer 130 will be moved aside by the outer edges of the discs 108, as shown in FIG. 10.

More particularly, the clip members 146 of the shipping spacer 130 will disengage from the intermediary actuator arms 116, the flexure support members 142 will disengage from the flexures 118, and if present, the alignment tab 150 will pass through the channel 170. The alignment peg 138 (FIG. 3) remains engaged in the tooling bore 140, and the shipping spacer 130 will remain outside the perimeter of the disc stack 109 while the actuator assembly 110 pivots to the park position, shown in FIG. 10.

With the merge operation completed, the latch 126 is caused to secure the actuator assembly 110 in the parked position, and the merge comb 160 is retracted at step 212 of FIG. 6. If desired, the merge operation can be performed while the disc stack 109 is not attached to the base deck 102; in such a case, the actuator assembly 110 can be supported in a fixed position during the merging process by a suitable fixture that need not be described herein.

As the flex support finger members 166 pull away from the flexures 118, the spring forces imparted by the flexures 118 will cause the data transducer heads 120 to be pressed into abutment with the landing zones 128. The shipping spacer 130 is then removed from the actuator assembly 110 at step 214 and the merge routine is completed as indicated at step 216.

Figure 11:
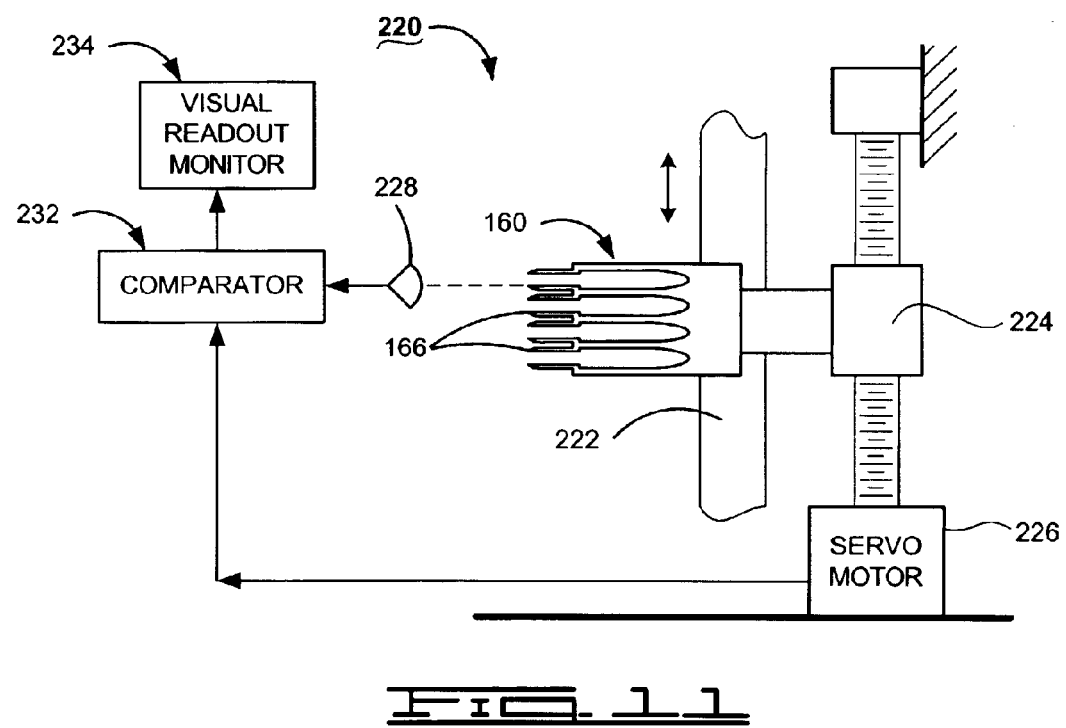
FIG. 11 is a diagrammatical representation of a merge inspection station constructed in accordance with preferred embodiments of the present invention.

Turning now to FIG. 11, shown therein is an automatic merge inspection station 220 constructed in accordance with preferred embodiments of the present invention. The merge inspection station 220 depicts the merge comb 160 mounted on a vertical slide 222 and attached to a ball screw 224 driven by a servomotor 226. It will be understood that other structure will be required for appropriately supporting the merge comb 160 to rotate it in a horizontal plane as described hereinabove and as illustrated in FIGS. 7, 8 and 10; however, it is sufficient for the present description to refer to the diagrammatical representation of FIG. 11 for the vertical movement of the merge comb 160.

The merge inspection station 220 has an edge detector means 228 that forms an edge or surface detecting boundary 230. The edge detector means 228 can be one or more conventional photoelectric devices, each having an emitter and a receiver, or any equivalent device that emits and forms a detecting boundary, and which provides a signal to a comparator 232 when traversed by a physical member.

In the present instance, as the merge comb 160 is moved past the detector means 228, the finger members 166 passing the detecting boundary of the edge detector means 228 that provides transition readings in the form of electrical signals to the comparator 232. As desired, the comparator 232 can have a circuit with a microprocessor having stored therein acceptable values of the merge inspection station 220 that are necessary for the merge comb 160 to be considered acceptable for the merging operation. Preferably, however, it is sufficient that the edge detector means 228 provide signals responsive to the emitter transitions as the finger members 166 traverse the detecting boundary 230, and together with travel distance input from the servomotor 226, the precise dimensional values of each of the flexure support finger member 166 can be determined. The relative position, or elevation, of each flexure support finger member 166 can then be determined by the comparator, and a calculation is made to determine whether the flexure support finger members 166 and the supporting merge arms 164 have retained their dimensional values within specification tolerances.

Figure 12:
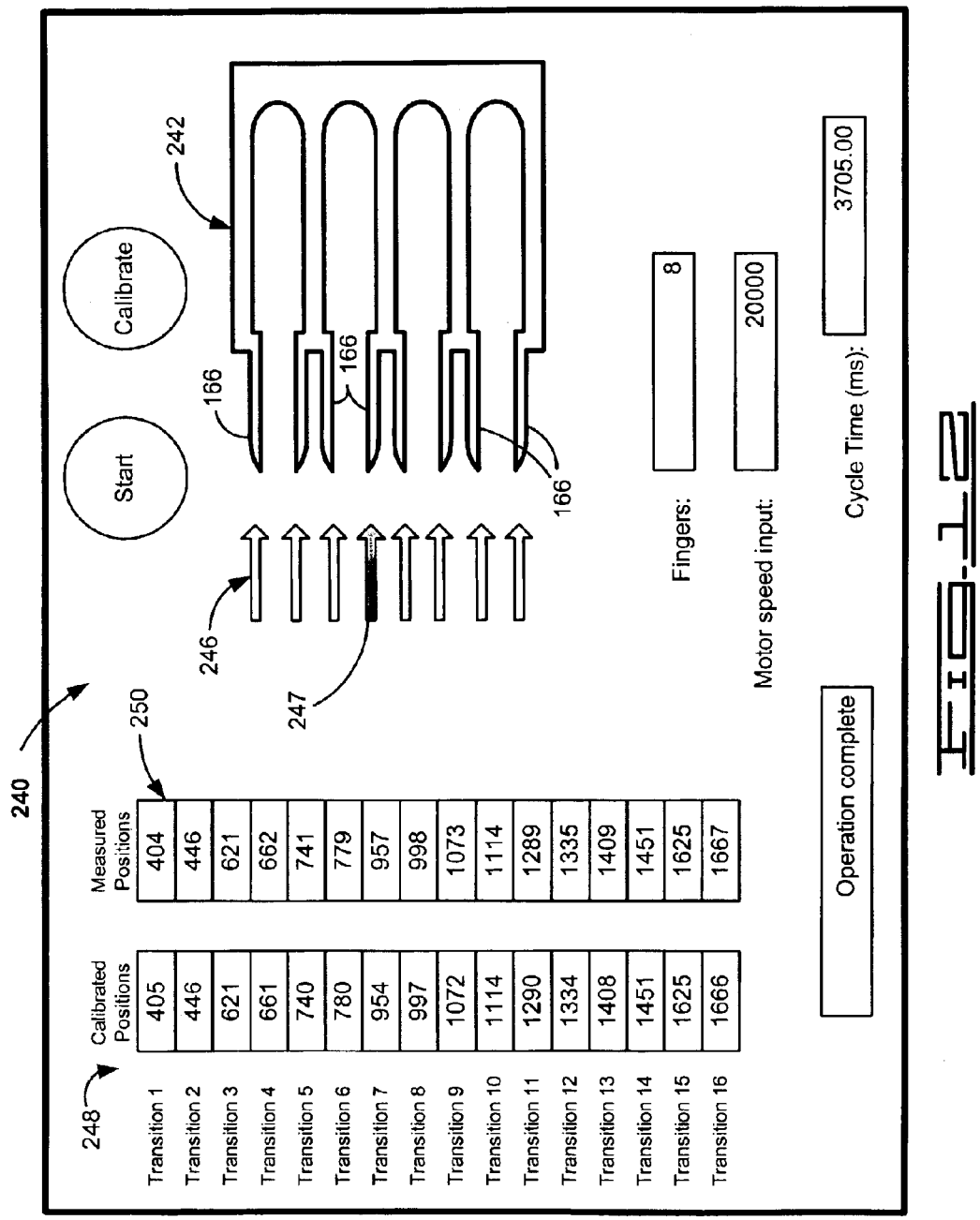
FIG. 12 is a view of the screen of a readout monitor of the merge inspection station of FIG. 11.

The dimensional values generated by the comparator 232 responsive to the edge detector means 228 can be fed to a visual readout monitor 234. FIG. 12 shows a screen readout 240 that has a merge comb profile field 242, which preferably conforms to the actual profile of the merge comb 160. The screen readout can be programmed to change the merge comb profile 232 to exhibit any number of profiles to be configured as representative of the tool being monitored by the merge inspection station 220.

The screen readout 230 also has a stacked array of arrow fields 246, each such arrow field pointing to an edge of one of the flexure support fingers 166 members represented in the merge comb profile field 242. A stacked array of target dimensions fields 248 and a juxtapositoned, stacked array of actual dimensions fields 250 are provided.

Displayed within the target dimensions fields 248 are the maximum dimensional values, or elevational locations of, the corresponding edges of each of the flexure support finger members 166 of the merge comb 160. Displayed within the actual dimensions fields 250 are the actual measured dimensional values, or the elevational locations of, the corresponding edges of each of the flexure support finger members 166 of the merge comb 160.

When the measured dimensional values are displayed in the actual dimensions fields 250, the programming is determined to illuminate the arrow fields 246, such as at arrow field 247, that correspond to unacceptable conditions, thereby publishing notification of an out of spec condition and information of which flexure support finger members 166, if any, do not meet the specified dimensional requirements. Preferably, when the comparator 232 determines that any portion of the inspected merge comb 160 deviates from an accepted nominal, it will also initiate an appropriate sound alarm and shut down the merging operation by an appropriate circuit (not shown).

Once the merging operation is halted due to a finding of an unacceptable merge comb, the out of spec merge comb 160 can be removed and replaced with another merge comb 160. As will be made clear from below, the merge operation will not proceed until the replacement merge comb 160 is then found to meet the programmed specification by the merge inspection station 220.

Figure 6A:
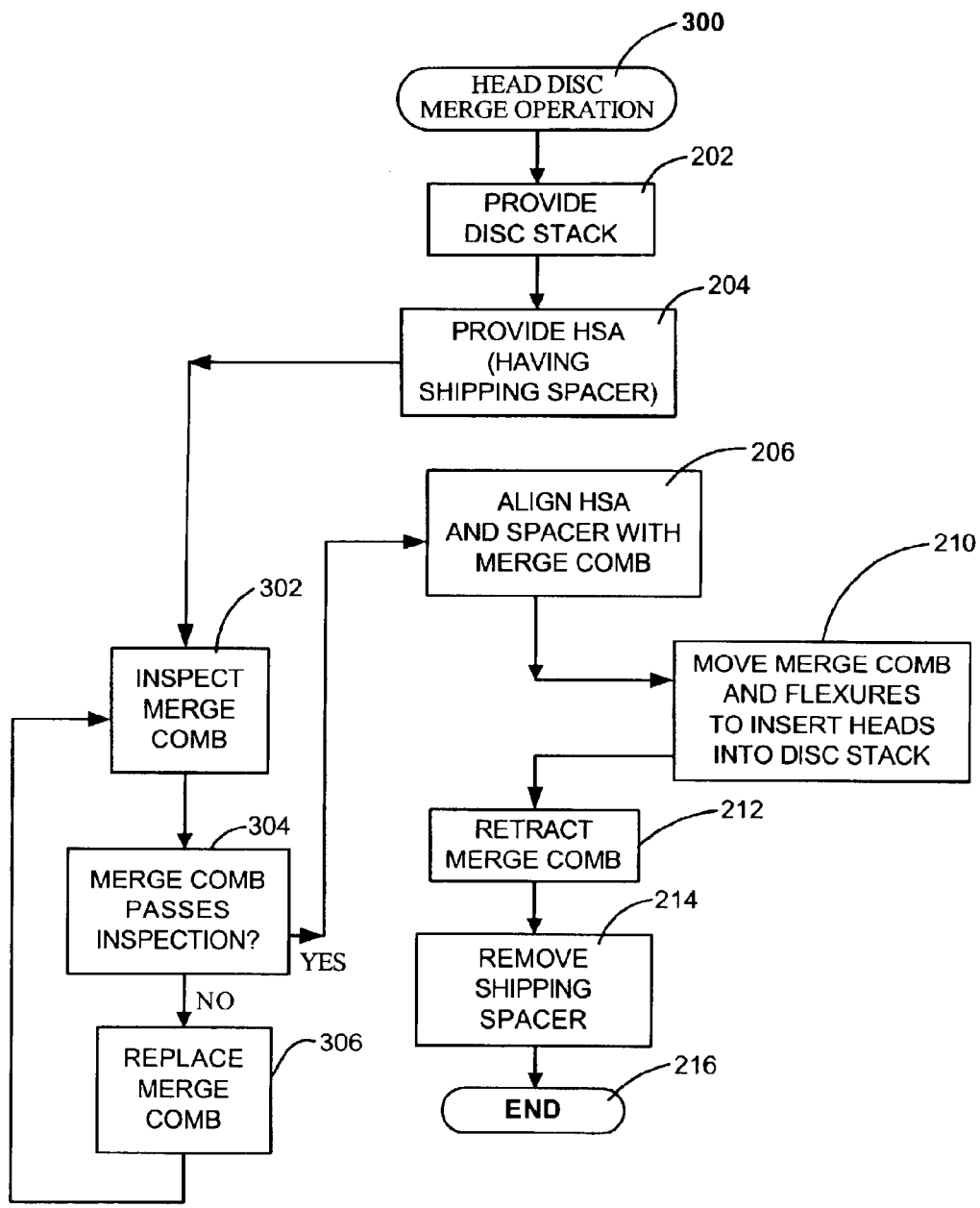
FIG. 6A is a flow chart depicting a head disc and disc stack merge operation at a head disc merge assembly station utilizing the merge inspection station of the present invention.

A flow chart showing a head disc merge operation 300 carried out according to preferred embodiments of the present invention is shown in FIG. 6A. As with the above described merge operation 200 (FIG. 6), the disc stack (such as the disc stack 109) is provided at step 202 and an actuator assembly (such as the actuator assembly 110) with a shipping spacer (such as the shipping spacer 130) is provided at step 204. As above, there are applications in which a shipping spacer may not be present, and as such, the presence or absence of a shipping spacer will have no bearing on the merge inspection station 220.

The disc stack 109 and the actuator assembly 110 will generally have a respective orientation at this point as shown in FIG. 7, with the data transducer heads 120 at a position beyond the outermost diameter of the disc stack 109. The disc stack 109 and the actuator assembly 110 are preferably mounted to the base deck 102 at this time. However, this is not limiting since the merge operation can alternatively be carried out prior to attachment of the actuator assembly 110 and disc stack 109 to the base deck 102.

Continuing with the flow chart of FIG. 6A, the merge comb 160 is inspected as indicated at step 302 by the merge inspection station 220 in the manner described hereinabove. As indicated at step 304, if the merge comb 160 does not pass inspection at the merge station 220, the defective merge comb 160 is replaced at step 306. The replacement merge comb 160 is then moved vertically to the merge inspection station 220 for inspection as indicated at step 302. If the replacement merge comb 160 passes inspection as at step 304, the replacement merge comb 160 is advanced at step 206 to align with the actuator assembly 110 (FIG. 8) by the robotic arm 208. It will be understood that an occasional replacement merge comb 160 will not pass the inspection of step 302, but each replacement comb is subjected to the inspection step 302, and the merging operation 300 will not proceed until a replacement merge comb 160 is determined to be acceptable.

The alignment of the actuator assembly 110 and the shipping spacer 130 with the merge comb 160 during step 206 results in the placement of the flexure support members 142 into respective positions to support the flexures 118 (FIG. 9), and when present, the engagement of the shipping spacer alignment tab 150 with the merge comb alignment channel 170. The elevational orientation of the shipping spacer 130 is determined so that the flexures 118 properly align with the flex support finger members 166 and with the discs 108.

As mentioned above, prior inspection of the merge comb 166 before each merge insertion cycle assures that potential damage is averted as the flex support finger members 166 of the merge comb 160 are brought into appropriate alignment with the discs 108. That is, mechanical interference is avoided between the flexures 118 and the discs 108, as subsequent advancement of the merge comb 160 into the disc stack 109 will occur without contact between the data transducer heads 120 and the discs 108.

Continuing with the flow chart of FIG. 6A at step 210, the merge comb 160 is next used to advance the data transducer heads 120 to the desired final parked position (FIG. 10). As the merge comb 160 is advanced beyond the orientation shown in FIGS. 8 and 9, the shipping spacer 130 will come into contact with the outer edges of the discs 108, and the shipping spacer 130 will be moved aside by the outer edges of the discs 108.

More particularly, the clip members 146 of the shipping spacer 130 will disengage from the intermediary actuator arms 116; the flexure support members 142 will disengage from the flexures 118; (when present, the alignment tab 150 will pass through the channel 170); and the shipping spacer 130 will remain outside the perimeter of the disc stack 109 while the actuator assembly 110 pivots to the parked position.

With the merge operation completed, the latch 126 is caused to secure the actuator assembly 110 in the parked position, and the merge comb 160 is retracted at step 212 of FIG. 6A. As mentioned above, the merge cycle can be performed, if desired, on the disc stack 109 while unattached to the base deck 102 by supporting the actuator assembly 110 in an appropriate fixture.

As the flex support finger members 166 pull away from the flexures 118, the spring forces imparted by the flexures 118 will cause the data transducer heads 120 to be pressed into abutment with the landing zones 128. The shipping spacer 130 is then removed from the actuator assembly 110 at step 214 and the merge routine is completed as indicated at step 216.

Figure 13:
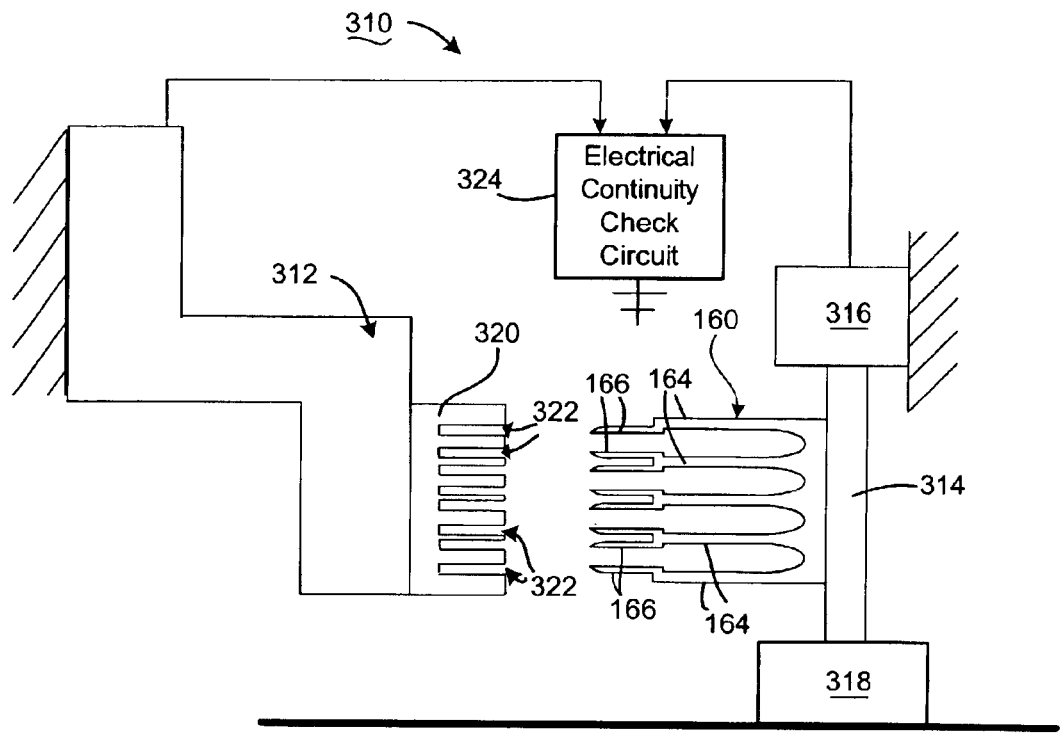
FIG. 13 is a diagrammatical representation of a merge inspection station constructed in accordance with another preferred embodiment of the present invention.
Figure 14:
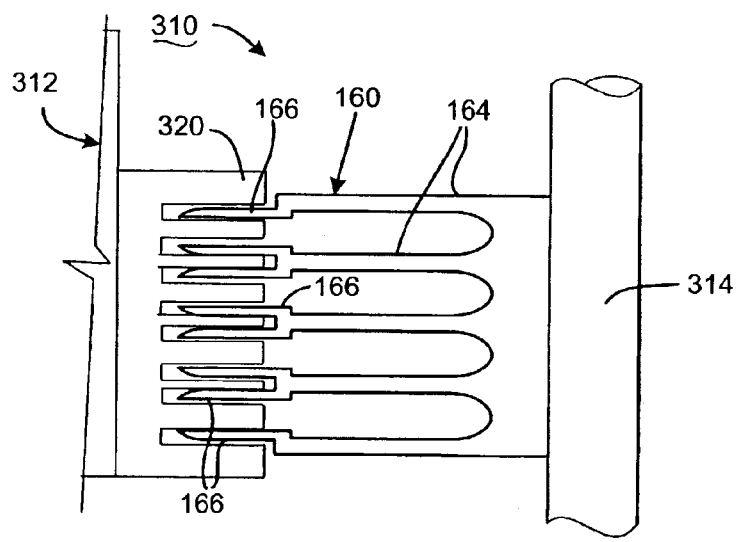
FIG. 14 is a diagrammatical representation of the merge comb and gage assembly of FIG. 13 depicting the disposition of the fingers of the merge comb in clearing engagement with the certification slots of the gage comb assembly.

A merge inspection station 310 constructed in accordance with further preferred embodiments of the present invention is depicted in FIGS. 13 and 14. For convenience of reference and reader clarity, the merge comb 160, described herein above in a different set-up, is shown now in FIGS. 13 and 14 as part of the merge station 310.

In addition to the merge comb 160, shown in FIG. 13 is a gage comb assembly 312, which can be used in the manner described hereinabove in the merging operation of the actuator assembly 110 with the disc stack 109 of the disc drive 100 of FIG. 1. The merge inspection station 310 depicts the merge comb 160 mounted for rotation on a vertical support arm 314, which is supported by a bearing block 316 and a servomotor 318 for selective rotation when the merge comb 160 is inspected by the gage comb assembly 312 in the manner to be described.

It will be understood that other structure will be required for appropriately supporting the merge comb 160 for use in the merging operation of the actuator assembly 109 described hereinabove and illustrated FIGS. 7, 8 and 10. It is sufficient for the description of the merge inspection station 310 to refer to the diagrammatical representation of FIG. 13 for the rotational movement of the merge comb 160.

The gage comb assembly 312 at the merge inspection station 310 has a body portion 320 having several certification slots 322, the number of certification slots 322 being equal to the number of flexure support finger members 166 supported by the number of merge arms 164. As discussed further below, the certification slots 322 are dimensioned and spatially supported to precisely simulate the spacing of the disc stack 109 as it is supported for merging with the actuator assembly 110. Each intermediate merge arm 164 supports a pair of flexure support finger members 166, as shown, while each of the upper and lower merge arms 164 supports a single flexure support finger member 166.

FIG. 14 depicts the rotation of the merge comb 160 to engage the gage comb assembly 312, and it will be noted that each of the flexure support finger members 166 is inserted into a corresponding one of the certification slots 322. The relative position, or elevation, of all flexure support finger members 166 can thus be determined to have an acceptable clearance to all by the discs 108 of the disc stack 109.

In the event that any of the flexure support finger members 166 do not enter their corresponding certification slots 322 in the gage comb assembly 312, there will be an interference between the merge comb 160 and the body portion 320 of the gage comb assembly 312. An electrical continuity check circuit 324 is grounded, or otherwise signaled by such interference, and the merge assembly station serviced by the merge inspection station 310 will be shut down. Upon this happening, there will also be activated an appropriate sound alarm to alert operating personnel of the shut down. The applicant's merge assembly stations are equipped with an electrical shut down circuit, the description of which has been elsewhere provided. Therefore, it is not believed necessary for the description of the present invention to provide further details of the electrical continuity check circuit, since such will be within the skill and knowledge level of one skilled in the art.

Once the merging operation is halted due to interference of the merge comb 160 with the gage comb assembly 312, the out of spec merge comb 160 can be removed and replaced with another merge comb 160. As will be made clear from below, the merge operation will not proceed until the replacement merge comb 160 is again moved to engage the gage comb assembly 312 found to successfully merge with all of the certification slots 322 thereof.

That is, the merge comb 160 and its merge arms 164 will have either an acceptable clearance condition or an unacceptable non-clearance condition defined as follows. In an acceptable clearance condition, the merge arms 164 of the merge comb 160 will successfully support the flexible suspension assemblies 118 (the flexures 118) of the actuator assembly 110 as the flexures 118 are merged with the disc stack. In an unacceptable clearance condition, the merge comb 160 has either been malformed, or damaged, so that the merge arms 164 thereof can not be used to support the flexures 118 during merging of the actuator 110 with the disc stack, as an interference at some physical location will occur. It is the purpose of the gage comb assembly 312 to simulate via the certification slots 320 the physical spacings of the disc stack 109. That is, to assure that the flexure arms will be supported at an elevation sufficient to have a clearing relationship between the data transducer heads 120 and the discs 108 as the data transducer heads are positioned on the data storage surfaces of the discs 108. In the non-acceptable condition the merge comb 160 will have an interference relationship with the disc stack 109, and therefore cannot be used.

Merging the merge comb 160 with the gage comb assembly 312 routinely during operation of the merge assembly station will rapidly identify a merge comb that has become damaged, and the damaged merge comb can be replaced before damaging the disc stack 109. Also, by merging the replacement merge comb with the gage comb assembly 312 prior to usage assures that the replacement merge comb has an acceptable clearance condition before use, thereby assuring immediate identification of an out-of-specification merge comb.

Figure 15:
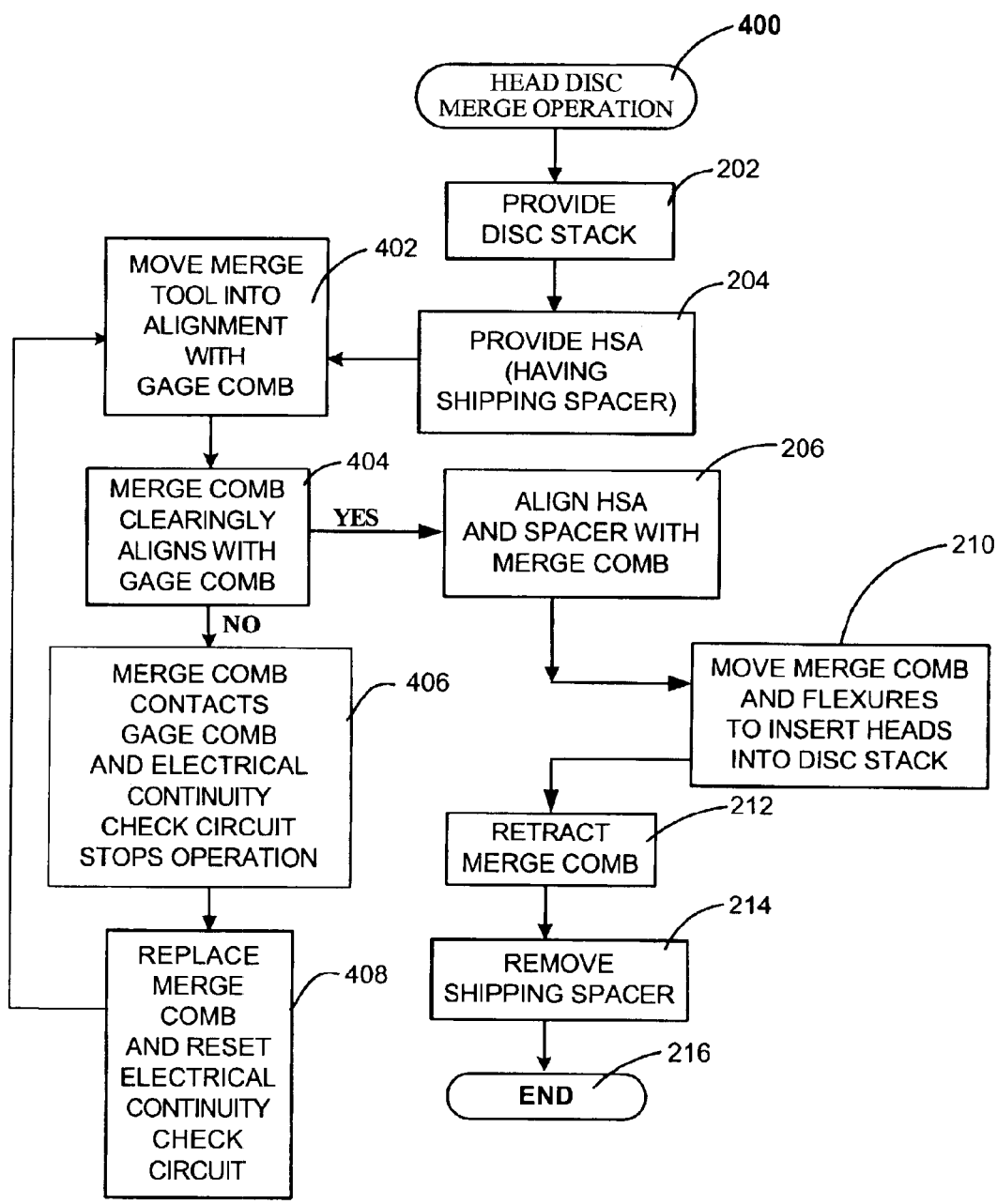
FIG. 15 is a flow chart depicting the steps of a head disc and disc stack merge operation having at a head disc merge assembly station utilizing the merge comb and gage comb assembly of FIGS. 13 and 14.

A flow chart showing a head disc merge operation 400 carried out according to preferred embodiments of the present invention is shown in FIG. 15. Several steps are similar to the merge operation 300 described above with reference to FIG. 6A, and the similar steps are designated by the same numbers in the following description of the merge operation 400. In the head disc merge operation 400 the disc stack (such as the disc stack 109) is provided at step 202 and an actuator assembly (such as the actuator assembly 110) with a shipping spacer (such as the shipping spacer 130) is provided at step 204. As above, there are applications in which a shipping spacer may not be present, and as such, the presence or absence of a shipping spacer will have no bearing on the merge inspection station 310.

The disc stack 109 and the actuator assembly 110 will generally have a respective orientation at this point as shown in FIG. 7, with the data transducer heads 120 at a position beyond the outermost diameter of the disc stack 109. The disc stack 109 and the actuator assembly 110 are preferably mounted to the base deck 102 at this time. However, this is not limiting since the merge operation can alternatively be carried out prior to attachment of the actuator assembly 110 and disc stack 109 to the base deck 102.

Continuing with the flow chart of FIG. 15, the merge comb 160 is inspected by moving the merge tool 160 into alignment with the certification slots 322 of the gage comb assembly 312, as indicated at step 402 by the merge inspection station 310 in the manner described herein above. As indicated at step 404, if the merge comb 160 clearingly engages the certification slots 322 of the gage comb 312, the merge comb 160 proceeds to align with the actuator assembly 110 as indicated at step 206. But if the merge comb 160 does not merge successfully with the gage comb 312, the electrical continuity check circuit 324 activates at step 406 to shut down the merge inspection station 310, and the defective merge comb 160 is replaced at step 408. The replacement merge comb 160 is then tested by moving it to merge with the gage comb 312, as indicated at step 402.

If the replacement merge comb 160 merges successfully with the certification slots 322 of the gage comb 312, this indicates that the replacement merge comb has an acceptable clearance condition, and the replacement merge comb 160 is advanced to step 206 to align with the actuator assembly 110 (FIG. 8). It will be understood that an occasional replacement merge comb 160 will not pass the inspection of step 402, but each replacement comb is subjected to the inspection step 402, and the merging operation 400 will not proceed until a replacement merge comb 160 is determined to have an acceptable clearance condition.

The alignment of the actuator assembly 110 and the shipping spacer 130 with the merge comb 160 during step 206 results in the insertion of the flexure support members 142 into respective positions to support the flexures 118 (FIG. 9). The elevational orientation of the shipping spacer 130 is adjusted to place the flexures 118 in an appropriate alignment with the flex support finger members 166 and with the discs 108.

As mentioned above, prior inspection of the merge comb 166 prior to a merge insertion cycle assures that potential damage is averted as the flex support finger members 166 of the merge comb 160 are brought into appropriate alignment with the discs 108. That is, mechanical interference is avoided between the flexures 118 and the discs 108, as subsequent advancement of the merge comb 160 into the disc stack 109 will occur without contact between the data transducer heads 120 and the discs 108. Preferably, the step 420 is performed before each use of the merge comb 160, but the testing of a merge comb as at steps 402 and 404 can be performed on a statistically assigned frequency; that is, experience may indicate that these steps can be by-passed on a selected inspection routine satisfactorily to eliminate the greatest portion of merge comb failures while achieving optimum cycle times for the head disc merge operation 300.

Continuing with the flow chart of FIG. 15 at step 210, the merge comb 160 is next used to advance the data transducer heads 120 to the desired final parked position (FIG. 10). As the merge comb 160 is advanced beyond the orientation shown in FIGS. 8 and 9, the shipping spacer 130 will come into contact with the outer edges of the discs 108, and the shipping spacer 130 will be moved aside by the outer edges of the discs 108.

More particularly, the clip members 146 of the shipping spacer 130 will disengage from the intermediary actuator arms 116; the flexure support members 142 will disengage from the flexures 118; (when present, the alignment tab 150 will pass through the channel 170); and the shipping spacer 130 will remain outside the perimeter of the disc stack 109 while the actuator assembly 110 pivots to the parked position.

With the merge operation completed, the latch 126 is caused to secure the actuator assembly 110 in the parked position, and the merge comb 160 is retracted at step 212 of FIG. 15. As mentioned above, the merge cycle can be performed, if desired, on the disc stack 109 while unattached to the base deck 102 by supporting the actuator assembly 110 in an appropriate fixture.

As the flex support finger members 166 pull away from the flexures 118, the spring forces imparted by the flexures 118 will cause the data transducer heads 120 to be pressed into abutment with the landing zones 128. The shipping spacer 130 is then removed from the actuator assembly 110 at step 214 and the merge routine is completed as indicated at step 216.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application of the merge comp inspection apparatus and method without departing from the spirit and scope of the present invention.

In addition, although the embodiments described herein are generally directed to a merge comb inspection apparatus and method for the manufacture of a disc drive data storage device, it will be appreciated by those skilled in the art that the merge comb inspection apparatus and method can be used for other types of data storage systems without departing from the spirit and scope of the claimed invention.

What is claimed is:

1. A head disc merge assembly for use at a merging station where an actuator assembly is merged with a disc stack, the actuator assembly having a flexure arm supporting a data transducer head and the disc stack having a disc with a data storage surface, the head disc merge assembly comprising:

a merge comb having a merge arm to engage and support the flexure arm, the merge comb having one of an acceptable condition and an unacceptable non-clearance condition, in the acceptable condition the merge arm supporting the flexure arm at an elevation sufficient to establish a clearing relationship between the data transducer head and the disc as the data transducer head is positioned adjacent the data storage surface, in the non-acceptable condition the merge comb having an interference relationship with the disc stack; and a gage comb assembly supported at the head disc merge assembly station, the gage comb assembly further comprising a gage comb body wherein the gage comb body has a certification slot and the merge comb is engageable with the gage comb in the certification slot to indicate whether the merge comb has the acceptable clearance condition or the unacceptable non-clearance condition.

2. The head disc merge assembly of claim 1, the head disc merge assembly further comprising means for moving the merge comb into engagement with the gage comb assembly, the merge arm clearingly received in the certification slot when the merge comb has an acceptable clearance condition, and the merge arm abuttingly engaging the gage comb body when the merge comb has an unacceptable non-clearance condition.

3. The head disc merge assembly of claim 1, when the merge comb has an unacceptable non-clearance condition and the merge comb is moved into engagement with the gage comb assembly, the gage comb assembly comprising:

means for stopping the merging station thereby disabling the merge tool so the comb can be replaced.

4. The head disc merge assembly of claim 3, wherein the merge arm has a flexure support finger at one end thereof, the flexure support finger member configured to be received in the certification slot when the merge comb is in the acceptable clearance condition.

5. The head disc merge assembly of claim 4, wherein the merge comb is configured to place the data transducer head at a textured landing zone on the data storage surface, thereafter to retract to a position beyond an outermost diameter of the data storage surface, the data transmission head remaining on the landing zone.

6. The head disc merge assembly of claim 5, wherein the gage comb is positioned for engagement therewith by the merge comb when the merge comb is at the retract position.

7. A merge assembly for merging an actuator assembly with a disc stack, the actuator assembly having at least one flexure supporting a data transducer head and the disc stack having a disc with a data storage surface, the merge assembly comprising:

a gage comb assembly comprising:

a body having a certification slot; and
means for stopping the merging station when activated to disable the merge comb for replacement;

a merge comb having a merge arm to engage and support the flexure arm, the merge comb having one of an acceptable condition and an unacceptable non-clearance condition, in the acceptable condition the merge arm supporting the flexure arm at an elevation sufficient to establish a clearing relationship between the data transducer head and the disc as the data transducer head is positioned adjacent the data storage surface, in the non-acceptable condition the merge comb having an interference relationship with the disc stack; and means for moving the merge comb into engagement with the gage comb assembly, the merge arm clearingly received in the certification slot when the merge comb has an acceptable clearance condition, and the merge arm abuttingly contacting the gage comb body when the merge comb has an unacceptable non-clearance condition, the means for stopping the merging station activated when the body of the gage comb is abbutingly engaged by the merge comb.

8. The merge assembly of claim 7, wherein the merge arm has a flexure support finger at one end thereof, the flexure support finger member configured to be received in the certification slot when the merge comb has the acceptable clearance condition.

9. The merge assembly of claim 8, wherein the merge comb is configured to place the data transducer head at a textured landing zone on the data storage surface, thereafter to retract to a position beyond an outermost diameter of the data storage surface, the data transmission head remaining on the landing zone.

10. The merge assembly of claim 9, wherein the gage comb is positioned for engagement therewith by the merge comb when the merge comb is at the retract position.

* * * * *